(12) United States Patent
Castleberry

(10) Patent No.: US 6,168,821 B1
(45) Date of Patent: *Jan. 2, 2001

(54) GLUCAN CONTAINING NUTRITIONAL PRODUCT AND METHOD OF MAKING THE SAME

(75) Inventor: Elen Castleberry, Chico, CA (US)

(73) Assignee: The J. M. Smucker Company, Orrville, OH (US)

( * ) Notice: Under 35 U.S.C. 154(b), the term of this patent shall be extended for 0 days.

This patent is subject to a terminal disclaimer.

(21) Appl. No.: 09/438,918

(22) Filed: Nov. 12, 1999

Related U.S. Application Data

(63) Continuation of application No. 09/053,220, filed on Apr. 1, 1998, now Pat. No. 6,020,016.

(51) Int. Cl.$^7$ .................................. A23L 2/00; A23L 2/02
(52) U.S. Cl. ............................. 426/590; 426/18; 426/20; 426/21; 426/28; 426/49; 426/599; 426/650
(58) Field of Search .................. 426/18, 20, 21, 426/28, 49, 590, 599, 650

(56) References Cited

U.S. PATENT DOCUMENTS

| | | |
|---|---|---|
| 4,377,602 | 3/1983 | Conrad . |
| 4,816,283 | 3/1989 | Wade et al. . |
| 4,996,063 | 2/1991 | Inglett . |
| 5,458,893 * | 10/1995 | Smith ...................................... 426/18 |
| 5,490,997 * | 2/1996 | Devine et al. .......................... 426/18 |
| 5,686,123 * | 11/1997 | Lindahl et al. ......................... 426/28 |

OTHER PUBLICATIONS

Anon. "Modified Oatrim finds Use in Healthy Beverages". Food Engineering, (1994) 65 pp 1–22.*
Print of 9 pages from Annals of Nutrition & Metabolism dated 1996.
Anon. "Modified Oatrim finds use in healthy beverages." Food Engineering. (1994) 65 pp. 1–22.

* cited by examiner

Primary Examiner—Helen Pratt
(74) Attorney, Agent, or Firm—Vickers, Daniels & Young

(57) ABSTRACT

An acidic fruit or vegetable beverage having improved nutritional value. The beverage includes the addition of natural fiber, glucans and a flavoring agent to the beverage. The glucans are substantially derived from a natural grain, such as oats. The flavoring agent includes vanilla flavoring. The vanilla flavoring may be natural vanilla and/or artificial vanilla. The pH of said beverage is typically 3.7–7. The glucans are present in the beverages in amounts up to 5 gram per liter and the glucans contain a substantial amount of water soluble β-glucans. The beverage is typically a ready-to-drink beverage.

56 Claims, No Drawings

GLUCAN CONTAINING NUTRITIONAL PRODUCT AND METHOD OF MAKING THE SAME

This patent application is a continuation, of application Ser. No. 09/053,220 filed on Apr. 1, 1988, now U.S. Pat. No. 6,020,016 and incorporated herein by reference.

The present invention relates to a nutritional product, and more particularly, to a liquid nutritional product containing natural grains and/or grain derivatives, as well as a method for the preparation thereof.

BACKGROUND OF THE INVENTION

In the food industry, there has been a growing demand for the production of nutritional food products. One class of nutritional food products are those containing natural grains and fibers. These types of foods are typically low in fat, have been shown to lower cholesterol, contain a high proportion of polyunsaturated fats, contain many essential amino acids and minerals, contain a high proportion of protein, and provide other physiological benefits. Historically, the common source of grains and fibers has been in the form of breads and cereals. The use of natural grains and fibers in other foods has been less successful due to the insolubility of the grain and fiber and the inability to mask the taste and/or texture of the grains and fibers in various food products.

Due to the popularity of natural grains and fibers, there have been significant developments in the processing of grains and fibers. Several grain derivatives have been developed for use in various other foods. Two such products are disclosed in U.S. Pat. Nos. 4,377,602; 4,996,063 and 5,686,123, all of which are incorporated herein by reference as background information. Conrad 4,377,602 discloses the preparation of hydrolyzed products made from whole grains. The grains are subjected to a proteolytic enzyme and amylase to obtain a liquid fraction containing soluble proteins and soluble starch. Inglett U.S. Pat. No. 4,996,063 discloses the preparation of water-soluble dietary fiber compositions. The grains are treated with amylases to obtain a liquid containing soluble proteins. Lindahl U.S. Pat. No. 5,686,123 discloses the preparation of a cereal suspension. The grains are treated with α-amylase and β-amylase to obtain a milky liquid containing soluble β-glucan. The derivative products may be used as a fat mimetic in various food products or can be added to a variety of food products.

Although grains and their derivative products have been used in a wide variety of foods, the use of such products in conjunction with fruits and vegetables have produced unacceptable products. The problems associated with adding grains and/or grain derivatives to fruit juices and/or vegetable juices poses even more problems. The grain derivatives tend to discolor the juice product, produce a cloudy juice product, form sediment in the juice product, adversely affect the flavor of the juice product and produces an undesired aftertaste in the juice product. As a result, there continues to be a demand for a fruit and/or vegetable drink which has enhanced nutritional value from grains, and is pleasing in taste and appearance.

SUMMARY OF THE INVENTION

The present invention pertains to a juice product which includes the added nutritional advantages associated with grains. More particularly, the invention relates to a fruit juice and/or vegetable juice which includes natural grains and/or a derivative product of the grain to enhance the nutritional value of the juice without adversely affecting the flavor and appearance of the juice.

In accordance with the specific embodiment of the present invention, there is provided a fruit juice and/or vegetable juice which includes a grain and/or grain derivative. The grain derivative includes soluble proteins, starches, amino-acids, minerals and/or vitamins. Preferably the grain derivative includes glucans. Glucans are modified starches and proteins which exhibit excellent nutritional value and can lower cholesterol levels. One particular type of glucan which is used is β-glucans. This type of glucan has been recognized by the FDA to positively affect cholesterol levels in humans. The glucan content of the juice product is added in a sufficient amount to appreciatively enhance the nutritional value of the juice product and to lower cholesterol levels when regularly taken in effective amounts. The grain derivative may include soluble and non-soluble fibers or may be processed in a manner to eliminate the non-soluble fibers prior to the grain derivative being added to the juice product. The source of the glucan may be derived from grains such as oats, wheat, maize, barley, rye, corn, rice and mixtures thereof. In one particular embodiment, the glucans are substantially derived from oats.

In accordance with another embodiment of the present invention, the glucans are formed by an enzymic reaction with a natural grain. Preferably, the natural grain is treated with amylase such as alpha and/or beta amylase. The use of amylases as the enzymic reactant has been found to produce a large quantity of glucan from the natural grain. When the glucan content is to be substantially free of insoluble fibers, the insoluble fibers from the grain may be removed prior to or subsequent to the enzymic reaction. Once the enzymic reaction is completed, the glucans may be isolated from the resultant suspension, or added in part or whole to the fruit and/or vegetable juice. When the glucans are added to fruit juices, the insoluble fiber content of the glucan is preferably minimized. Insoluble fibers in fruit juices tend to settle due to the low viscous nature of the fruit juices thereby resulting in sediment in the fruit juice. This sediment is undesirable in many instances and can cause cloudiness in the fruit juice when the fruit juice is agitated. The insoluble fibers are preferably filtered out prior to adding the grain derivative to the fruit juice. The modified fruit juice is also preferably filtered prior to packaging to remove any remaining insoluble fibers. Higher viscosity fruit juices and most vegetable juices may have the insoluble fiber added or removed from the juice product. High viscous liquids inhibit and/or prevent the insoluble fibers from settling. The inclusion of the insoluble fibers in the juice product can provide added health benefits to the juice product.

In accordance with still another embodiment of the present invention, a flavoring agent is added to the juice product to mask the adverse flavors from the added natural grains and/or grain derivatives to the juice product. The addition of natural grains and/or grain derivatives produces an undesired aftertaste such as a bitter aftertaste in the juice product. The grains and/or grain derivatives can also produce undesired flavors in the juice product. A flavoring agent such as vanilla flavoring has been found to neutralize the bitter aftertaste from the added grains and/or grain derivatives. The vanilla flavoring also neutralizes and/or masks the undesirable flavors and other adverse flavors from the natural grains and grain derivatives. The vanilla flavoring may be a natural and/or artificial flavoring. As can be appreciated, the vanilla flavoring may be the sole flavoring agent and/or may be used with other flavoring agents such as almond flavoring to mask and/or neutralize the undesired aftertaste and/or undesired flavors from the natural grains and derivatives. The flavoring agent content can be at least 1.5%.

In accordance with yet another aspect of the present invention, the juice product is acidified by the addition of one or more acids. The juice product is preferably an acidic product. For juice products based upon fruit juices, the pH is preferably less than 4.5. The pH can be at least as low as 3.5. For juice products based upon vegetable juice, the pH is preferably greater than 4.5. Acids such as malic acid, citric acid, tartaric acid, phosphoric acid, folic acid, ascorbic acid and/or pantothenic acid are added to the juice product to reduce the pH of the juice product.

In accordance with yet another aspect of the present invention, the juice product is pasteurized to extend the life of the juice product. Preferably the juice product is pasteurized at temperatures of at least 165° F. and preferably between 165–290° F. The pasteurization process allows the juice produce to be sold as a shelf stable product and/or a refrigerated product. The acidity of the juice product may be selected, in combination with pasteurization, to further extend the shelf life of the juice product. A combination of pasteurization and acidity control allows the juice product to be hot filled and/or cold-fill aseptic. Alternatively, or in addition to pasteurization, the juice product may be concentrated and then frozen for later reconstitution.

In accordance with yet another aspect of the present invention, juice product includes a fruit and/or vegetable. The fruit and/or vegetable may be added in whole, as a liquid, a liquid concentrate, a puree or in another modified form. The liquid from the fruit and/or vegetable may be filtered prior to being used in the juice product. The fruit juice can include juice from tomatoes, berries, citrus fruit, melons and/or tropical fruits. A single fruit juice or fruit juice blends may be used in the juice product. The vegetable juice can include a number of different vegetable juices. Examples of the few of the many specific juices which may be utilized in the present invention include juice from berries of all types, currants, apricots, peaches, nectarines, plums, cherries, apples, pears, oranges, grapefruits, lemons, limes, tangerines, mandarin, tangelo, bananas, pineapples, grapes, tomatoes, rhubarbs, prunes, figs, pomegranites, passion fruit, guava, kiwi, kumquat, mango, avocados, all types of melon, papaya, turnips, rutabagas, carrots, cabbage, cucumbers, squash, celery, radishes, bean sprouts, alfalfa sprouts, bamboo shoots, beans and/or seaweed. As can be appreciated, one or more fruits, one or more vegetables, and/or one or more fruits and vegetables, can be included in the juice product to obtain the desired flavor of the juice product.

Still another aspect of the present invention, the juice product includes a stabilizer to produce the desired body, texture and stability to the juice product. Stabilizers are preferably derived from natural sources such as plants and the like, although some of the stabilizers may be modified in order to render them stable and food grade functional. Examples of stabilizers which can be utilized in the juice product include guar gum, locust bean gum, pectin, seaweed, xanthan gum, carrageenan, an alginate, cellulosegums, modified starches, gelatin and/or maltodextrins. Preferably, the stabilizer is selected to maintain the stability of the juice product and the consistency of the juice product.

In accordance with still yet another embodiment of the present invention, sweeteners are added to the juice product to attain a desired degree of sweetness, generally measured by a brix value. Brix is generally defined as a percent of soluble solids primarily made up of natural sugars. The juice product of the present invention generally has a brix value of at least 5. Various types of sweeteners may be added to obtain the desired brix value. These sweeteners include fructose syrup, sugar, grain syrups, honey, agave, and/or sweet fruit juices.

It is the principal object of the present invention to provide a juice product containing a fruit and/or vegetable juice which is highly nutritious.

Another object of the present invention is to provide a juice product containing grains and/or grain derivatives.

Still another object of the present invention is to provide a juice product which includes glucans substantially derived from natural grains.

Yet another object of the present invention is to provide a nutritious juice product which includes β-glucans that are derived substantially from natural grains.

Still yet another object of the present invention is to provide a juice product which includes grains and/or grain derivatives and conceals and/or neutralizes the adverse aftertaste and/or flavors from the grains and/or grain derivatives.

Yet another object of the present invention is to provide a juice product containing an effective amount of β-glucans to reduce cholesterol.

Still another object of the present invention is to provide a juice product having a brix value of at least 5.

Another object of the present invention is to provide a juice product which can be packaged as a frozen concentrate or packaged in liquid form and which product has an extended shelf life.

Still another object of the present invention is to provide an acidic juice product having a pH of less than 4.5.

Still yet another object of the present invention is to provide a juice product which is simple to manufacture, has excellent organoleptic properties, has substantially little, if any, bitter aftertaste resulting from the addition of grains and/or grain derivatives, and can be used in a wide variety of food applications.

These and other objects and advantages will become apparent to those skilled in the art upon reading the following description of the invention.

DETAILED DESCRIPTION OF THE PREFERRED EMBODIMENT

The present invention will be particularly described with respect to a juice product containing a fruit and/or vegetable juice, which juice product has an enhanced nutritional value and which can be directly consumed by consumers; however, it will be appreciated that the improved juice product can be used as an additive in a wide variety of food products.

In accordance with the invention, a juice product is provided in a liquid or concentrated form. The juice product preferably includes one or more fruit juices, or one or more vegetable juices. However, one or more vegetable juices may be combined with one or more fruit juices to obtain the desired flavor for the juice product. The term juice in association with fruit and/or vegetable is meant as any type of juice which is extracted from the fruit and/or vegetable by any conventional means. The juice may include fruit and/or vegetable juice, fruit and/or vegetable juice concentrate, fruit and/or vegetable puree, fruit and/or vegetable puree concentrate, fruit and/or vegetable juice concentrate puree, and the like. A fruit juice is preferably added as a juice or a concentrate. If a vegetable juice is added to the juice product, the vegetable is preferably added as a juice or in pureed form. A large variety of fruit juices and/or vegetable juices can be added to the juice product. Examples of fruits which can be added to the juice product include, but are not limited to, blueberry, cranberry, gooseberry, strawberry, raspberry, loganberry, blackberry, boysenberry, bilberry, mulberry, redcurrant, blackcurrant, apricot, peach, nectarine, plum, cherry, apple, crab apple, pear, orange, grapefruit, pomelo, lemon, lime, tangerine, mandarin, tangelo, banana, pineapple, grape, tomato, rhubarb, date, fig, pomegranate, persimmon, passionfruit, guava, kiwi, lichee, star fruit, kumquat, mango, avocado, watermelon, cantaloupe, honeydew, pawpaw and/or papaya. Examples of vegetables which can be added to the juice product include, but are not limited to, turnip, rutabaga, carrot, potato, cabbage, cauliflower, collards, sprouts, beans, spinach, asparagus, artichoke, leeks, onion, garlic, zucchini, squash, peppers, radish, celery, beets, pumpkin, sprouts, bamboo shoots, peas, watercress, mushrooms and/or seaweed. Water is typically added to the fruit juice and/or vegetable juice when the juice is added as a concentrate or puree.

The juice product includes a grain product that is added to the fruit juice and/or vegetable juice. The grain product is defined as a grain and/or grain derivative. The grain product may be in the form of a liquid, a liquid concentrate and/or a dry form. The grain product is finely ground into powder form prior to adding the grain product to the juice product. A wide variety of grains may be used in this juice product. One preferable grain is oats; however, grains such as wheat, maize and rice, etc. may be used in combination with the oats. The oat grain includes a large amount of insoluble proteins, starches and other nutrients. These insoluble components can settle in the juice product. To prevent settling, the oat grain is preferably subjected to an enzymic reaction to convert many of the insoluble grain components into soluble compounds. Preferably the oat grain is reacted with amylase to form soluble glucans.

In one preferred embodiment, oat grains are finely ground into powder form. The oat grains may be dry or wet ground. Course fiber material is then removed by filtration, decanting and/or centrifuging. As can be appreciated, if the insoluble fiber is to be included in the juice product, the step of removing the insoluble fibers is skipped. The oat grains are then combined with one or more amylases. The oat grains are modified during the enzymic reaction to form grain derivatives containing soluble glucans. Preferably a substantial amount of soluble β-glucans are formed during the reaction. In one particular enzymic reaction, a milky oat derivative is obtained which includes over 10% by weight glucans. The glucans are then concentrated in a liquid or dry form. β-glucans are recognized by the FDA as providing important nutritional value to foods. The addition of glucans also can lower the cholesterol levels in humans when consumed in effective amounts.

The grain product is added to the juice product in an amount such that the glucan content in the juice product constitutes at least about 0.01 grams per liter of the final juice product. Preferaby, the glucan content in the form of β-glucans is at least 0.75 grams per liter of the final juice product. Typically, the glucan content of the final juice product does not exceed 5 grams per liter.

The juice product also includes a flavoring agent such as vanilla, to round out the flavor of the juice product, to mask the bitter aftertaste in the juice product from the addition of the grain product, and to neutralize the undesired flavors resulting from the addition of the grain product. The vanilla flavoring has also been found to provide a creamy flavor to the final juice product. The vanilla flavoring may be artificial and/or natural. Preferably, the vanilla constitutes 0.01 to 1% of the juice product. Other flavoring agents may be used in combination with the vanilla flavoring to reduce or mask the aftertaste and/or unwanted flavors from the grain product.

The acidity of the juice product is controlled by the addition of a natural and/or organic acids. Preferably, citric acid is added to the juice product. However, other acids may be included in the juice product. The acid is added in sufficient amounts to reduce the pH of the juice product below 7. For fruit juice products, the pH is preferably less than about 4.5. The acidity of the juice product is selected to extend the shelf life, refrigerated or non-refrigerated, of the juice product and/or to provide the desired degree of tartness of the juice product. The pH of a juice product containing vegetable juice may be greater than 4.5 but less than 7. The pH of the juice products containing fruit juice may also be between 4.5 and 7.

Sweeteners are preferably added to the juice product to obtain the desired sweetness of the juice product and the desired brix value. Sweeteners such as sugars, corn sweeteners, honey and the like may be used. Preferably, the sweeteners are added in sufficient amount to obtain a brix value of about 2–20 and more preferably, about 11–16. As can be appreciated, brix values are typically lower than 11 for juice products containing vegetable juices. Preferably natural sweeteners are used in the juice product. As can be appreciated, the addition of sweeteners may not be required for juice products naturally containing the desired amount of sweeteners.

A stabilizer is preferably added to the liquid mixture to maintain the body and stability of the juice product. Stabilizers such as pectin, xanthan gum, carrageenan and cellulose gums are preferably used. The content of the stabilizer in the juice product is preferably about 0.01 to 1% of the juice product. A stabilizer is preferably added to juice products containing fruit juice to form a stable product. The stabilizer has been found to stabilize the fruit and/or vegetable juice and grain product to deliver a thick and/or creamy mouthfeel upon consumption.

The juice product can also include coloring agents; spices and/or herb extracts; and/or flavoring enhancers. Coloring agents, such as dye, can be used to produce and/or enhance the desired color of the juice product. The coloring agent may be natural and/or artificial. If a coloring agent is used, the coloring agent is preferably less than about 3% of the juice product and more preferably about 0.01–2% of the juice product. Flavoring enhancers, such as fruit or vegetable extracts, can be used to enhance the fruits and/or vegetable flavors in the juice product. The flavoring enhancer may be natural and/or artificial. If a flavoring enhancer is used, the flavoring enhancer is preferably less than about 3% of the juice product, and more preferably about 0.0–2% of the juice product. Spices and/or herbal extracts may be added to the juice product to add distinctive flavors to the juice product. Such spices and/or herbs may include cinnamon, licorice, wintergreen, coffee, chocolate, sasparilla, and the like. If spices and/or herbs are added to the juice product, the spices and/or herbs preferably constitute less than about 2% of the juice product, and more preferably about 0.01–2% of the juice product.

The juice product may be sold in a frozen concentrated form, a liquid concentrated form or and/or a ready-to-drink form. The juice product may be processed to be sold as a refrigerated product and/or a shelf stable product. Refrigerated products are typically pasteurized with temperatures of about 165–185° F., and cold-filled aseptically into sterile containers. In such products, the pH of the juice product is moderate to very acidic. If the juice product is to be sold as a shelf stable product, the pH of the product is preferably below 4.5. The pasteurizing temperatures of such juice product may range from 195–290° F. and are preferably about 195–205° F. The combination of pasteurization and acidity control of the juice product significantly extends the life of the juice product.

A general formulation of the juice product is as follows:

| | | |
|---|---|---|
| Grain product | 5–50% | |
| Sweeteners | 0–20% | |
| Fruit | 1–20% | |
| Flavoring agent | 0.1–1% | |
| Flavoring enhancer | 0–2% | |
| Coloring agent | 0–2% | |
| Acid | 0.05–40% | |
| Stabilizer | 0.01–1% | |
| Glucans | 0.05–5 g/l | |
| pH | 3.7–7 | |
| Brix value | 5–20 | |

The resulting juice produce has the following properties:

Provides a remarkable creamy mouthfeel with a light and pleasant aftertaste compared to current grain beverages.

Provides a low fat juice product that imparts in richness associated with high fat products due to the grain and fruit and/or vegetable combination.

Provides 0.75 grams of β-glucans per serving size to lower cholesterol.

Provides a refreshing, thirst quenching high fiber beverage that also provides a feeling of satiety.

Results in a juice product that is reminiscent of dairy in a non-dairy base.

Provides a juice product that delivers a unique thick and creamy mouthfeel.

Provides a juice product that is an easy, quick solution for people desiring to add fiber to the diet.

Provides a healthy alternative to existing snacks.

Provides a nutritious addition to a quick lunch.

Results in a juice product having no bitter aftertaste from grain product.

Results in a juice product that combines the healthy benefits of fruit and/or vegetables with the nutritional benefits of a grain based beverage.

Allows for lower pH which enables lower temperatures when processing to obtain a commercially sterile product resulting in improved flavors, colors and shelf life when compared to grain based beverages that do not have the addition of fruit and/or vegetables.

Provides for the addition of fruit juices that add natural vitamins, such as natural vitamin C or beta-carotene, to a grain based beverage which is normally deficient in such vitamins.

Provides a juice product containing fruit and/or vegetable juices/purees that is unique and not just an alternative to milk.

The juice product exhibits excellent aroma, flavor and organoleptic characteristics and matches closely to the sensory properties of the natural fruit juice and/or vegetable juice. The presence of the modified grain in the juice product functions to enhance the nutritional value of the juice product without adversely affecting the flavor, appearance and/or aftertaste of the juice product. This unique formulation of the grain product, fruit and/or vegetable juices and flavors yields a novel product that is healthy and delivers a truly delicious taste. The unique formulation of the juice product is distinct from current grain based beverages and fruit or vegetable beverages. This unique formulation provides a unique balance of brix/acid ratio (sweet/tart ratio) to produce a superior product. Preferably the brix to acid ratio for fruit juice products is 10–20 brix: 3.7–4.5 pH, and more preferably 11–16 brix; 3.75–4.05 pH. This unique brix: Acid ratio allows for lower temperatures to be used during processing of the juice product thus resulting in a superior product.

The following examples are provided as an illustration of the juice product composition of the present invention.

EXAMPLE 1

An apple flavor juice product was made having the following ingredients:

| | |
|---|---|
| Apple juice concentrate | 105 lb |
| Water | 208 lb |
| Apple essence | 3.3 lb |
| Xanthin gum | 1.5 lb |
| Carrageenan | 2.6 lb |
| Grain product | 67.4 lb |
| Vanilla | 5.8 lb |
| Citric Acid | 1.1 lb |
| Brix | 12 |
| pH | 3.8 |
| β-glucans | 0.8 g/l |

Apple juice concentrate and water were mixed together with apple essence, a stabilizer of xanthin gum and carrageenan, a grain product and a vanilla flavoring agent. The grain product was substantially free of insoluble fibers and contained β-glucans. Citric acid was added to reduce the pH to 3.8. The ingredients were mixed together and pasteurized at a temperature of about 200° F. A final mixture having a brix value of about 12 and a β-glucan content of 0.8 g/l was obtained. The pasteurized product was then cold filled in a sterilized containers to be sold as a non-refrigerated product.

EXAMPLE 2

A tomato flavor juice product was produced having the following ingredients.

| | |
|---|---|
| Tomato puree | 250.6 lb |
| Water | 40.2 lb |
| Guar gum | 6.1 lb |
| Grain product | 85 lb |
| Vanilla | 4.6 lb |
| Ascorbic Acid | 05. lb |
| Brix | 5 |
| pH | 5.8 |
| β-glucans | 0.9 g/l |

The tomato puree was mixed with a small amount of water, a stabilizer of guar gum, a grain product, vanilla and a small amount of ascorbic acid (vitamin C). The tomato puree constitutes about 65% of the beverage. The grain product included insoluble fibers and β-glucans. The β-glucan content of the mixture was about 0.9 g/l. The mixture had a brix value of at least 5, and a pH of about 5.8.

The mixture was pasteurized at temperatures of about 175° F. and cold filled into a sterilized container to be sold as a refrigerated product.

The invention has been described with reference to a preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

I claim:

1. A fruit and/or vegetable nutritional product for human consumption having improved nutritional value, reduced grain aftertaste, reduced sediment formation, and reduced discoloration, comprising a fruit and/or vegetable juice, a grain product containing glucans, an acid, a sweetener, and at least an effective amount of a grain masking flavoring agent to mask the flavor of the grain product, said glucans being substantially derived from a natural grain, said grain masking flavoring agent includes a food flavoring selected from the group consisting of vanilla flavoring, almond flavoring and mixtures thereof, said acid content producing a pH of about 3.5–7, said sweetener content producing a brix value of about 2–20.

2. A nutritional product as defined in claim 1, wherein the pH of said nutritional product is less than about 4.5.

3. A nutritional product as defined in claim 1, wherein said glucans are present in an amount of about 0.01 to 5 gram per liter.

4. A nutritional product as defined in claim 1, wherein said glucans are substantially β-glucans.

5. A nutritional product as defined in claim 1, wherein said glucans are derived from a grain, selected from the group consisting of oats, wheat, maize, barley, rye, corn, rice and mixtures thereof.

6. A nutritional product as defined in claim 1, wherein said glucans are soluble in water.

7. A nutritional product as defined in claim 1, wherein said nutritional product is a ready-to-drink beverage.

8. A nutritional product as defined in claim 1, wherein said nutritional product is a concentrated beverage.

9. A nutritional product as defined in claim 1, wherein said fruit or vegetable is selected from the group consisting of citrus fruits, berries, carrots, celery, tropical fruits and mixtures thereof.

10. A nutritional product as defined in claim 1, wherein said vanilla flavoring and/or almond flavoring is selected from the group consisting of natural sources, artificial sources, and mixtures thereof.

11. A nutritional product as defined in claim 1, wherein said acid is selected from the group consisting of malic acid, citric acid, tartaric acid, phosphoric acid and mixtures thereof.

12. A nutritional product as defined in claim 1 comprises:

| | |
|---|---|
| Grain product | 5–50% |
| Fruit and/or vegetable | 1–65% |
| Grain Masking Flavoring Agent | 0.01–1.5% |
| Acid | 0.05–40% |
| Glucans | 0.01–5 g/l. |

13. A nutritional product as defined in claim 12 comprises:

| | |
|---|---|
| Grain product | 15–50% |
| Sweetener | up to 20% |
| Fruit and/or Vegetable (solids, juice, concentrate) | 1–65% |
| Vanilla flavoring | 0.01–1.5% |
| Fruit flavors | 0.0–2% |
| Coloring agent | 0.0–2% |
| Stabilizer | 0.01–1% |
| β—Glucans | 0.05–2 g/l |
| Acid | 0.05–40% |
| pH | 3.5–7 |
| Brix value | 2–20. |

14. A nutritional product as defined in claim 1, wherein said juice having a weight percentage greater than the weight percentage of said grain product.

15. A nutritional product as defined in claim 1, including a sweetener and an acid to form a specific sweet/tart ratio, said sweetener content forming a brix value of about 10–20, said acid content forming a pH of about 3.7–4.5, said juice containing a majority of fruit juice.

16. A nutritional product as defined in claim 1, including a sweetener and an acid to form a specific sweet/tart ratio, said sweetener content forming a brix value of about 5–11, said acid content forming a pH of greater than about 4.5 to less than about 7, said juice containing a majority of vegetable juice.

17. A method for producing an acidic nutritional fruit and/or vegetable nutritional product having improved nutritional value, reduced grain aftertaste, reduced sediment formation, and reduced discoloration, comprising the addition of an acid, a sweetener and a grain product containing glucans and at least an effective amount of a grain masking flavoring agent to at least partially mask the flavor of the grain product, said glucans being at least partially derived from a natural grain, said grain masking flavoring agent including a food flavoring selected from the group consisting of vanilla flavoring, almond flavoring and mixtures thereof, said acid content producing a pH of about 3.5–7, said sweetener content producing a brix value of about 2–20.

18. The method as defined in claim 17, wherein said natural grain includes oats, wheat, maize, barley, rye, corn, rice, or mixtures thereof.

19. The method as defined in claim 17, wherein said glucans include β-glucans.

20. The method as defined in claim 17, wherein said glucans comprise about 0.01 to 5 g/liter of said nutritional product.

21. The method as defined in claim 20, wherein said glucans comprise at least about 0.75 g/l of said nutritional product.

22. The method as defined in claim 17, wherein said glucans are at least partially soluble in water.

23. The method as defined in claim 17, wherein said fruit and/or vegetable is selected from the group consisting of citrus fruits, berries, carrots, celery, tropical fruits and mixtures thereof.

24. The method as defined in claim 17, wherein said vanilla flavoring and/or almond flavoring is selected from the group consisting of natural sources, artificial sources, and mixtures thereof.

25. The method as defined in claim 17, including the step of adding said acid to said nutritional product to reduce the pH of said nutritional product to less than 4.5.

26. The method as defined in claim 17, wherein said acid is selected from the group consisting of malic acid, citric acid, tartaric acid, phosphoric acid and mixtures thereof.

27. The method as defined in claim 17, including the step of pasteurizing said nutritional product, said pasteurizing including pasteurization temperatures of 165–205° F.

28. The method as defined in claim 17, wherein said nutritional product comprises:

| | |
|---|---|
| Natural grains | 5–50% |
| Sweetener | up to 20% |
| Fruit and/or Vegetable | 1–65% |
| Grain masking flavoring agent | 0.01–1.5% |
| Fruit flavoring agent | 0–2% |
| Coloring agent | 0–2% |
| Acid | 0.005–40% |
| Stabilizer | 0.01–1% |
| Glucans | 0.05–5 g/l |
| pH | 3.7–7 |
| Brix value | 10–20. |

29. The method as defined in claim 17, wherein said fruit and/or vegetable having a weight percentage greater than the weight percentage of said grain product.

30. The method as defined in claim 17, including the additional of a sweetener and an acid to form a specific sweet/tart ratio, said sweetener added to form a brix value of about 10–20, said acid added to form a pH of about 3.7–4.5.

31. The method as defined in claim 17, including the additional of a sweetener and an acid to form a specific sweet/tart ratio, said sweetener added to form a brix value of about 5–11, said acid added to form a pH of greater than about 4.5 to less than about 7.

32. A fruit and/or vegetable nutritional product for human consumption having improved nutritional value, reduced grain aftertaste, reduced sediment formation, and reduced discoloration, comprising a fruit and/or vegetable, a grain product containing water-soluble glucans and natural insoluble grain fibers, an acid, a sweetener, and at least in effective amount of a grain masking flavoring agent to at least partially mask the flavor of the grain product, said grain masking flavoring agent includes a food flavoring selected from the group consisting of vanilla flavoring, almond flavoring, and mixtures thereof, said glucans being at least partially derived from a natural grain, said glucans are substantially β-glucans, said fruit and/or vegetable having a weight percentage greater than the weight percentage of said grain product, said acid content producing a pH of about 3.5–7, said sweetener content producing a brix value of about 2–20, said nutritional product including:

| | |
|---|---|
| Grain product | 5–50% |
| Fruit and/or vegetable | up to 65% |
| Grain masking flavoring agent | 0.01–1.5% |
| Acid | 0.05–40% |
| Glucans | 0.01–5 g/l. |

33. A nutritional product as defined in claim 32, wherein said nutritional product is acidic.

34. A nutritional product as defined in claim 33, wherein the pH of said nutritional product is less than about 4.5.

35. A nutritional product in claim 32, wherein said nutritional product is a ready-to-drink beverage.

36. A nutritional product as defined in claim 32, wherein said nutritional product is a concentrated beverage.

37. A nutritional as defined in claim 32, wherein said nutritional product is a frozen beverage.

38. A nutritional product as defined in claim 32 comprises:

| | |
|---|---|
| Grain product | 15–50% |
| Sweetener | up to 20% |
| Fruit | up to 65% |
| Vanilla flavoring | 0.01–1.5% |
| Fruit flavors | 0–2% |
| Coloring agent | 0–2% |
| Stabilizer | 0.01–1% |
| Glucans | 0.05–2 g/l |
| Acid | 0.05–40% |
| pH | 3.5–7 |
| Brix value | 2–20. |

39. A fruit and/or vegetable nutritional product for human consumption having improved nutritional value, reduced grain aftertaste, reduced sediment formation, and reduced discoloration, comprising a fruit and/or vegetable, a grain product containing water-soluble glucans and natural insoluble grain fibers, an acid, a sweetener, and at least an effective amount of a grain masking flavoring agent to at least partially mask the flavor of the grain product, said glucans being at least partially derived from a natural grain, said fruit and/or vegetable having a weight percentage greater than the weight percentage of said grain product, said acid content producing a pH of about 3.5–7, said sweetener content producing a brix value of about 2–20, said nutritional product including:

| | |
|---|---|
| Grain product including water insoluble fibers | 5–50% |
| Fruit and/or vegetable | 1–65% |
| Grain masking flavoring agent | 0.01–1.5% |
| Acid | 0.05–40% |
| Glucans | 0.01–5 g/l; | said grain masking flavoring agent includes a food flavoring selected from the group consisting of vanilla flavoring, almond flavoring, and mixtures thereof.

40. A nutritional product as defined in claim 39, wherein said vanilla flavoring and/or almond flavoring is selected from the group consisting of natural sources, artificial sources, and mixtures thereof.

41. A nutritional product as defined in claim 39, wherein said acid is selected from the group consisting of malic acid, citric acid, tartaric acid, phosphoric acid and mixtures thereof.

42. A nutritional product as defined in claim 39, comprises:

| | |
|---|---|
| Grain product | 15–50% |
| Sweetener | up to 20% |
| Fruit | up to 65% |
| Vanilla flavoring | 0.01–1.5% |
| Fruit flavors | 0–2% |
| Coloring agent | 0–2% |
| Stabilizer | 0.01–1% |
| Glucans | 0.05–2 g/l |
| Acid | 0.05–40% |
| pH | 3.5–7 |
| Brix value | 2–20. |

43. A nutritional product as defined in claim 39, including a sweetener and an acid to form a specific sweet/tart ratio, said sweetener content forming a brix value of about 10–20, said acid content forming a pH of about 3.7–4.5, said juice containing a majority of fruit juice.

44. A nutritional product as defined in claim 39, including a sweetener and an acid to form a specific sweet/tart ratio, said sweetener content forming a brix value of about 5–11, said acid content forming a pH of greater than about 4.5 to less than about 7, said juice containing a majority of vegetable juice.

45. A nutritional product for human consumption having improved nutritional value and reduced grain aftertaste comprising a fruit and/or vegetable, a grain product containing water-soluble glucans and natural insoluble grain fibers, and at least an effective amount of a grain masking flavoring agent to at least partially mask the flavor of the grain product, said grain masking flavoring agent includes a food flavoring selected from the group consisting of vanilla flavoring, almond flavoring, and mixtures thereof, said glucans being at least partially derived from a natural grain, said glucans are substantially β-glucans, said fruit and/or vegetable having a weight percentage greater than the weight perecentage of said grain product, said nutritional product including:

| | |
|---|---|
| Grain product | 5–50% |
| Fruit and/or vegetable | up to 65% |
| Grain masking flavoring agent | at least about 0.01% |
| Acid | up to 40% |
| Glucans | 0.01–5 g/l. |

46. A nutritional product as defined in claim 45, including an acid, said acid content producing a pH of about 3.5–7.

47. A nutritional product as defined in claim 46 wherein said acid is selected from the group consisting of malic acid, citric acid, tartaric acid, phosphoric acid and mixtures thereof.

48. A nutritional product as defined in claim 46, wherein said nutritional product is acidic.

49. A nutritional product as defined in claim 45, including a sweetener, said sweetener content producing a brix value of about 2–20.

50. A nutritional product as defined in claim 45, wherein said nutritional product is a ready-to-drink beverage.

51. A nutritional product as defined in claim 45, wherein said nutritional product is a concentrated beverage.

52. A nutritional product as defined in claim 45, wherein said nutritional product is a frozen beverage.

53. A nutritional product for human consumption having improved nutritional value and reduced grain aftertaste comprising a fruit and/or vegetable, a grain product containing water-soluble glucans and natural insoluble grain fibers, and at least an effective amount of a grain masking flavoring agent to at least partially mask the flavor of the grain product, said grain masking flavoring agent includes a food flavoring selected from the group consisting of vanilla flavoring, almond flavoring, and mixtures thereof, said glucans being at least partially derived from a natural grain, said fruit and/or vegetable having a weight percentage greater than the weight percentage of said grain product, said nutritional product including:

| | |
|---|---|
| Grain product | 5–50% |
| Fruit and/or vegetable | up to 65% |
| Grain masking flavoring agent | at least about 0.01% |
| Acid | up to 40% |
| Glucans | 0.01–5 g/l | said grain masking flavoring agent includes a food flavoring selected from the group consisting of vanilla flavoring, almond flavoring, and mixtures thereof.

54. A nutritional product as defined in claim 53 wherein said vanilla flavoring and/or almond flavoring is selected from the group consisting of natural sources, artificial sources, and mixtures thereof.

55. A nutritional product as defined in claim 53, comprises:

| | |
|---|---|
| Grain product | 15–50% |
| Sweetener | up to 20% |
| Fruit and/or vegetable | up to 65% |
| Vanilla flavoring | 0.01–1.5% |
| Fruit flavors | 0–2% |
| Coloring agent | 0–2% |
| Stabilizer | 0.01–1% |
| Glucans | 0.05–2 g/l |
| Acid | 0.05–40%. |

56. A nutritional product as defined in claim 53, comprises:

| | |
|---|---|
| Grain product | 15–50% |
| Sweetener | up to 20% |
| Fruit | up to 65% |
| Vanilla flavoring | 0.01–1.5% |
| Fruit flavors | 0–2% |
| Coloring agent | 0–2% |
| Stabilizer | 0.01–1% |
| Glucans | 0.05–2 g/l |
| Acid | 0.05–40% |
| pH | 3.5–7 |
| Brix value | 2–20. |

* * * * *